(12) United States Patent
Davis et al.

(10) Patent No.: US 10,391,537 B2
(45) Date of Patent: Aug. 27, 2019

(54) METHOD AND SYSTEM FOR FLANGING A METAL PIECE

(71) Applicant: FORD MOTOR COMPANY, Dearborn, MI (US)

(72) Inventors: John W. Davis, Ypsilanti, MI (US); Kenneth James Schmidt, Novi, MI (US); Christian Richard Genereux, Brighton, MI (US)

(73) Assignee: Ford Motor Company, Dearborn, MI (US)

( * ) Notice: Subject to any disclaimer, the term of this patent is extended or adjusted under 35 U.S.C. 154(b) by 287 days.

(21) Appl. No.: 15/474,294

(22) Filed: Mar. 30, 2017

(65) Prior Publication Data
US 2018/0281041 A1    Oct. 4, 2018

(51) Int. Cl.
| | | |
|---|---|---|
| *B21D 9/08* | (2006.01) | |
| *B21D 19/08* | (2006.01) | |
| *B21D 22/30* | (2006.01) | |
| *B21D 35/00* | (2006.01) | |
| *B21D 22/26* | (2006.01) | |
| *B21D 24/00* | (2006.01) | |
| *B21C 37/02* | (2006.01) | |
| *B21J 5/08* | (2006.01) | |
| *B21C 37/06* | (2006.01) | |
| *B21D 53/88* | (2006.01) | |
| *B62D 25/16* | (2006.01) | |

(52) U.S. Cl.
CPC ............. *B21D 19/08* (2013.01); *B21C 37/02* (2013.01); *B21C 37/065* (2013.01); *B21D 22/26* (2013.01); *B21D 22/30* (2013.01); *B21D 24/005* (2013.01); *B21D 35/006* (2013.01); *B21J 5/08* (2013.01); *B21D 53/88* (2013.01); *B62D 25/16* (2013.01)

(58) Field of Classification Search
CPC ........ B21D 19/08; B21D 53/88; B21D 25/16; B21D 22/26; B21D 22/30; B21D 24/005; B21D 35/006; B21C 37/02; B21C 37/065; B21J 5/08; B62D 25/16
USPC .......................................................... 72/356
See application file for complete search history.

(56) References Cited

U.S. PATENT DOCUMENTS

| | | | | |
|---|---|---|---|---|
| 1,356,567 A | * | 10/1920 | Smith ................... | B21D 11/08 72/379.2 |
| 3,636,690 A | * | 1/1972 | White ..................... | B21D 7/00 248/74.3 |
| 3,753,366 A | * | 8/1973 | White ................... | B21D 11/08 72/409.18 |
| 4,266,416 A | * | 5/1981 | Festag .................... | B29C 51/06 72/60 |

(Continued)

*Primary Examiner* — David B Jones
(74) *Attorney, Agent, or Firm* — Ray Coppiellie; Brooks Kushman P.C.

(57) ABSTRACT

A method and system for flanging a metal part is provided to improve the final dimensions of the part to a desired shape. Residual stresses from flanging operations can distort a final shape of the metal part. This disclosure provides an initial flanging step in which metal gainers are formed into the metal during a first flanging step. The metal gainers provide an increased amount of metal at select regions. Then, during a next flanging step, the metal gainers are smoothened or removed during that flanging step while the metal is additionally bent. The metal gainers help combat the residual stresses and allow the flange to better take the desired shape.

14 Claims, 3 Drawing Sheets

(56) References Cited

U.S. PATENT DOCUMENTS

| | | | | |
|---|---|---|---|---|
| 4,783,985 A * | 11/1988 | LaBarge | B21D 51/383 | |
| | | | 29/509 | |
| 4,821,546 A * | 4/1989 | Story | B21D 26/055 | |
| | | | 29/421.1 | |
| 4,928,509 A * | 5/1990 | Nakamura | B21C 37/294 | |
| | | | 29/421.1 | |
| 5,647,239 A * | 7/1997 | Fischer | B21D 26/055 | |
| | | | 72/60 | |
| 6,672,121 B2 * | 1/2004 | Carsley | B21D 39/021 | |
| | | | 29/243.58 | |
| 6,675,626 B2 * | 1/2004 | Arai | B21D 11/08 | |
| | | | 72/379.2 | |
| 7,104,106 B1 * | 9/2006 | Loignon | B21D 17/02 | |
| | | | 72/387 | |
| 7,155,984 B2 * | 1/2007 | Fujita | G01D 11/245 | |
| | | | 73/862.08 | |
| 7,363,790 B2 * | 4/2008 | Kruger | B21D 22/02 | |
| | | | 29/421.1 | |
| 7,389,665 B1 * | 6/2008 | Luckey, Jr. | B21D 26/021 | |
| | | | 72/342.7 | |
| 9,511,403 B2 * | 12/2016 | Yonemura | B21D 22/26 | |

* cited by examiner

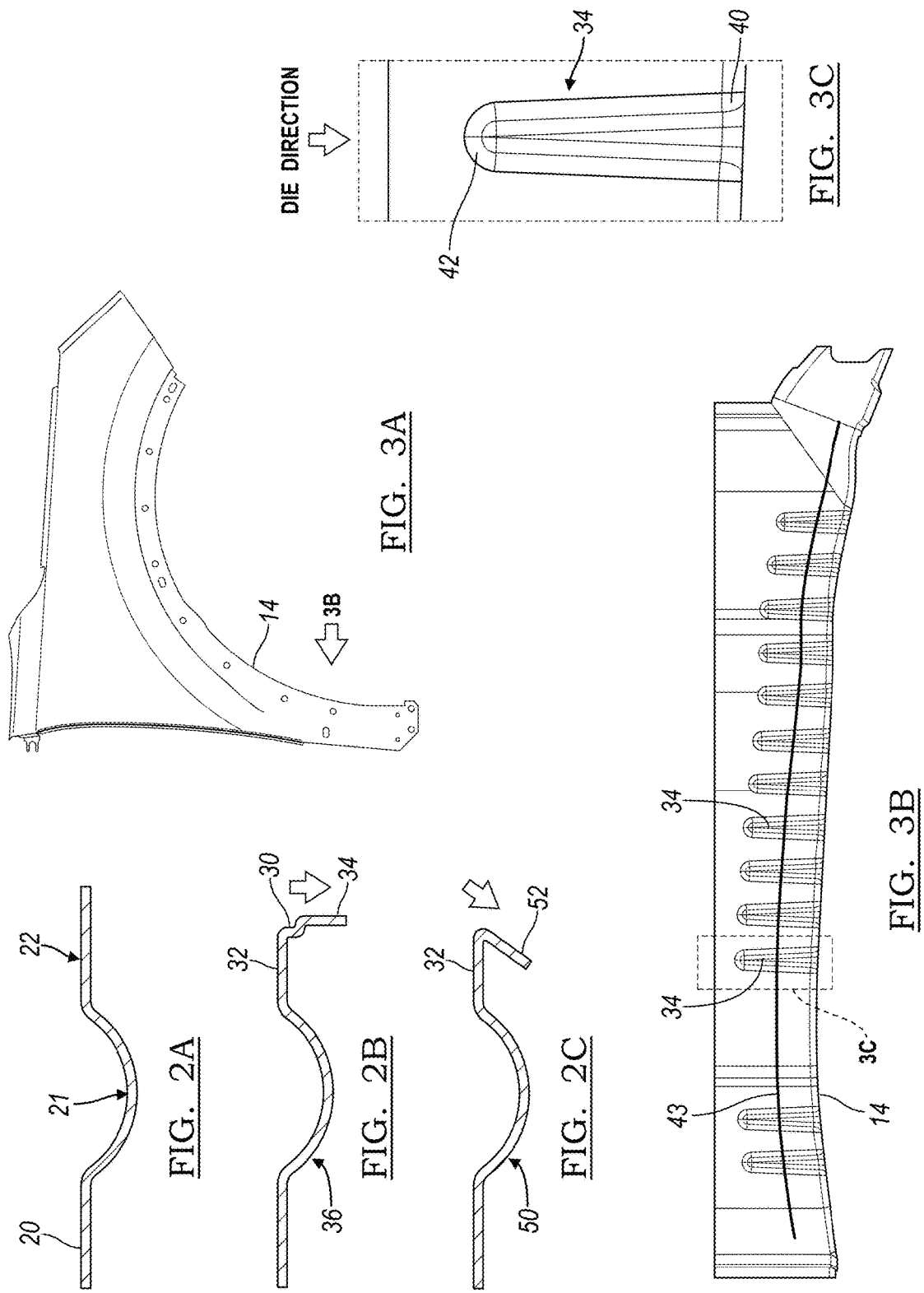

METHOD AND SYSTEM FOR FLANGING A METAL PIECE

TECHNICAL FIELD

This disclosure relates to a method and system for flanging a metal piece. In more detail, various embodiments of this disclosure relate to performing a first flanging operation to provide additional metal in certain portions of the metal piece, and then performing a second flanging operation to flatten the additional metal.

BACKGROUND

Many manufacturing processes are available to form sheet metal blanks into parts in a wide variety of industries. For example, drawing and deep drawing of sheet metal blanks is a process in which the metal blank is drawn between an upper die and a lower die to take a shape that might somewhat resemble the shape of the finished part. Such manufacturing processes are well-suited to form parts having less complex geometries.

Additional manufacturing processes might also take place after drawing. For example, flanging can bend an end region of the metal to form a flange. However, when flanges are formed, there may be residual stresses in regions of the flange that can distort the final shape of the part due to the stretching and bending of the metal to form the flange.

SUMMARY

According to one embodiment, a method of forming a metal part includes drawing a sheet metal blank to form a drawn region and a flange region. The method further includes performing a first flanging operation to the flange region with a first die to form an intermediate shaped part having a region of increased material on the flange region. The method further includes performing a second flanging operation to the intermediate shaped part with a second die to remove the region of increased material.

According to another embodiment, a method of forming a metal piece from sheet metal includes first flanging a sheet metal blank with a die that includes surface features to form an intermediate flanged piece having a flange with regions of increased material. Then, the method includes flanging the intermediate flanged piece to smoothen or remove the regions of increased material into a final formed part.

In yet another embodiment, a system for forming a metal piece from sheet metal includes a first die configured to draw the sheet metal to form a drawn piece. The system also includes a second die having surface features thereon configured to flange the drawn piece to include a flange with one or more regions of increased material formed by the surface features. The system also includes a third die having a flat surface configured to contact the flange and flatten the regions of increased material while further bending the flange.

BRIEF DESCRIPTION OF THE DRAWINGS

FIGS. 2A-2C illustrate sequential steps of forming a metal piece with a flange, such as a flange on the fender of FIG. 1A. FIG. 2A is a cross-sectional view of a drawing step. FIG. 2B is cross-sectional view of a first flanging step or intermediate flanging step in which a metal gainer is formed on the flange. FIG. 2C is a cross-sectional view of a second flanging step or final flanging step in which the flange is further formed and the metal gainers are formed into the final shape of the flange.

FIG. 3A is another front view of a fender of a vehicle body, according to one embodiment.

FIG. 3B is a side view of a flange of the fender about the wheel opening, as taken from the view of arrow 3B in FIG. 3A.

FIG. 3C is an enlarged view of one of the metal gainers of FIG. 3B.

DETAILED DESCRIPTION

Figure 1A:
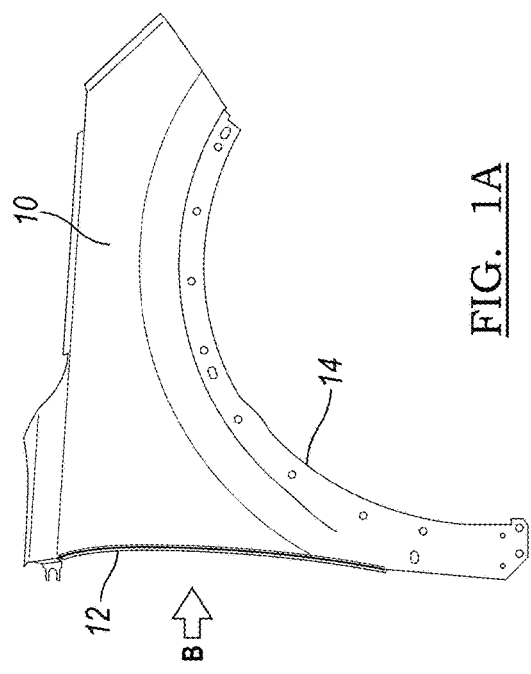
FIG. 1A is a front view of a fender of a vehicle body, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A stamped metal part may become dimensionally unstable or undesirable for later use in vehicle assembly due to stresses that can be a byproduct of the metal stamping process. Depending on the function of the metal part and its location in the vehicle, the dimensional defect can cause vehicle build issues and can be visibly undesirable to the driver or customer.

This undesirability may occur in a flange of a stamped part. Flanging is an operation in which a part of a metal piece, such as the end, is bent with respect to the body. In one example, the part is held stationary with its end sticking out over the edge of the lower die so that an upper die can press against the end of the part in a shearing motion (with respect to the stationary lower die) to bend the end of the metal part. The flanged part can then be assembled to remaining parts of the vehicle body. Typical regions of the vehicle body with a flanged edge region include a fender door line, a roof line, a fender wheel opening, and a liftgate outer roof line. In each of these regions, the flange may bend more than 90 degrees with respect to a body portion of the metal part such that it bends back towards the body portion.

The flanging process may include two steps after a metal part or blank is initially drawn to take an initial shape: (1) a flanging step in which the body of the metal part is held by a lower die with an end of the metal part sticking out over the edge of the die to allow another die (e.g., an upper die) to bend the end of the metal part to form an initial flange shape, and (2) a re-flanging or forming step in which the initial flange is further bent to its final shape. The flanging process can create unwanted stresses and strains in the flange area. And, the more the flange is required to bend, the more these stresses and strains may amplify. To improve the structure and reduce the stresses and strains in the flange areas, the drawing step may form the metal part such that additional or extra metal is provided in the areas of the metal part that will eventually form the flange. This additional or extra metal will then be pulled during the flanging steps. However, this method can only be partially effective, and can lead to a part that is over-stressed and becomes dimensionally incorrect.

According to various embodiments of this disclosure, a method, system, and tooling is disclosed in which "metal gainers" (e.g., regions of additional metal or increased material) is provided in the flange region of the metal piece during the first flanging step. The metal gainers provide extra metal for the secondary flanging or re-flanging step to improve the dimensional capability of the flange in its final form. The metal gainers include regions of increased material as compared to what would otherwise be a flat flange. For example, the metal gainers may include beads, waves, or convolutes in the metal while maintaining a generally consistent thickness of the metal in order to increase the amount of metal material in the flange region. The disclosed method along with the metal gainers help equalize the length of the line between the initial flange length and the finished flange length. In one embodiment, the metal gainers or extra metal is not provided during the drawing step. Various embodiments of carrying out this concept are explained below with reference to the Figures.

Figure 1B:
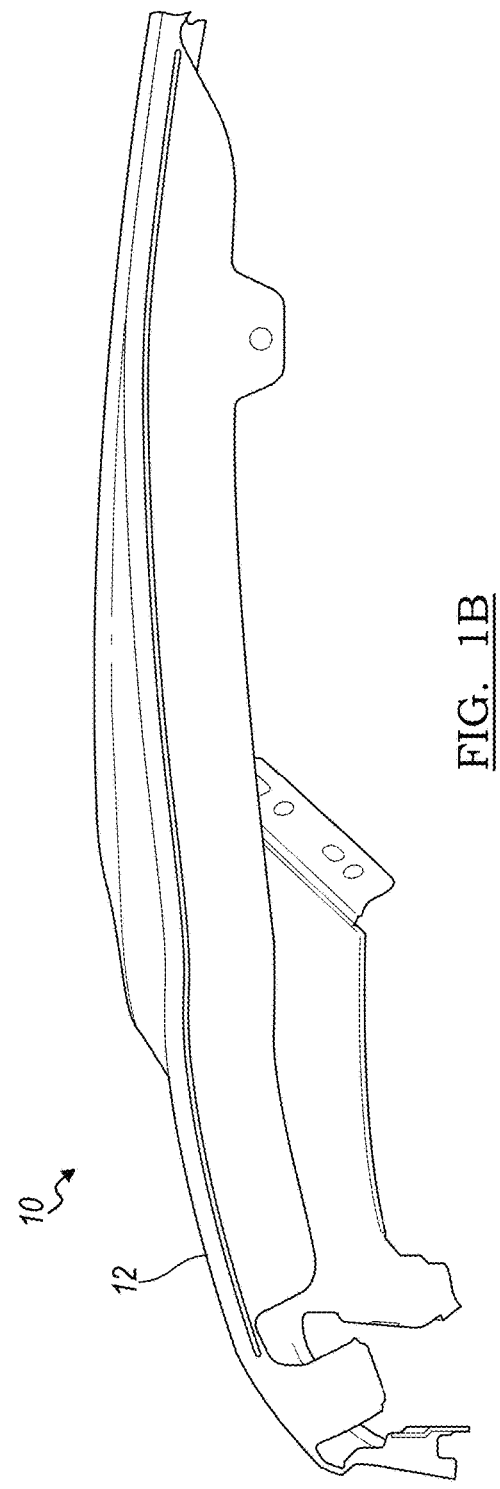
FIG. 1B is an exterior side view of a flange of the fender, as taken from the view of arrow 1B in FIG. 1A.

FIGS. 1A-1C show various views of a fender 10 of a body of a vehicle. The fender has edges that form a fender door line 12 and a fender wheel opening 14. These edges are examples of edges of the vehicle body in which a two-step flanging process may be necessary due to the final shape of the flange bending back toward a body of the metal sheet (i.e., bending more than 90 degrees). As will be described below, metal gainers are introduced in the flanging process, during the first of these two main flanging steps. Then, the finished flange die will wipe through the metal gainers, providing necessary metal to create a finished flange that is neutral or slightly compressed in its resting state.

FIGS. 2A-2C shows a sequential method of forming a sheet metal blank while forming metal gainers during the intermediate flanging step. First, FIG. 2A shows a drawing step. In this step, the sheet metal blank 20 is placed between an upper die and a lower die, and pressed to take the shape shown in the Figure. A drawn region 21 or body region results from the drawing step. This drawn region can be, for example, part of the vehicle body such as the fender. A flange region 22 is provided outboard of the drawn region. The flange region 22 is the region of the metal that will later be formed into a flange, bending relative to the drawn region 20. The drawing step results in a drawn metal piece.

Next, FIG. 2B shows a first flanging step (also referred to as an intermediate flanging step). In this step, the drawn metal piece is placed to rest on a lower die with part of the flange region from the drawing step extending over the edge or lip of the lower die. Another die, such as an upper die or die assembly, is moved in a sheering direction (e.g., down, as indicated by the arrow) to bend the part of the flange region that extends over the edge of the lower die. This forms an intermediate flange 30. The intermediate flange 30 extends at approximately a 90 degree angle from a body portion 32 of the flange region. The intermediate flange 30 is provided to prepare the flange region for the second flanging step in which the flange region is further bent.

To assist in the formation of the flange, the dies form the intermediate flange 30 such that the metal is stretched to form a plurality of metal gainers 34. The metal gainers are pods, beads, waves, or convolutes which provide regions of additional metal material on the flange. This additional metal is rolled or smoothened out during the final flanging step to provide benefits of reduced stresses at the flange, as described above, as well as equalized length of the line between the initial flange length and the finished flange length.

The metal gainers 34 may be formed between projections in the lower die and pockets or receptacles in the upper die. In another embodiment, the lower die is provided with the pockets and the upper die is provided with the projections. The projections in the lower die may project outwards toward the flange (e.g., to the right in FIG. 2B). During the intermediate flanging step, the flange is pressed between these two dies, which forces the metal to take the shape of the projections in the lower die. The resulting shape of the flange provides beads, convolutes, or surface features referred to as metal gainers to provide regions of increased material, which provides an extra amount of metal relative to other areas of the metal (such as body portion 32) or regions that would otherwise be a flat flange. This intermediate flanging step results in an intermediate shaped part 36.

Examples of the metal gainers are shown in FIGS. 3B-3C. In one embodiment, the metal gainers 34 include a first end 40 at the edge of the intermediate flange 30, and an opposing second end 42. The first end 40 may be wider than the second end 42 to provide more metal at the edge of the intermediate flange 30.

In one embodiment, a region between the first ends 40 and the second ends 42 of the metal gainers 34 of FIG. 3B can collectively define a trim line 43 that is a region where the flange is trimmed prior to any flanging operation.

Referring to FIG. 2C, the second flanging step or final flanging step produces a final formed part 50. During this step, the intermediate shaped part is placed on another die (e.g., between another lower and upper die). With similar sheering motion between the dies (e.g., in a new direction shown by the arrow), the intermediate flange 30 is bent relative to the body portion 32 such that the resulting final flange 52 is now bent over 90 degrees. The dies used in this step have flat engagement surfaces such that the metal gainers 34 are rolled or smoothened out. The additional metal from the metal gainers 34 has now been pressed and formed to relieve stresses that would otherwise be present in the final flange 52 to improve the desired shape of the final part.

The amount of added material in the metal gainers may depend on the difference between the flange length after the intermediate flanging step and the flange length after the final flanging step without the gainers. For example, forming the flange during an intermediate flanging step may result in a flange length of 100 mm without the gainers, and a final flanging step may result in a flange length of 80 mm. The amount of added material in the gainers should be present to accommodate for this difference. In one embodiment, the metal gainers 34 are formed with a depth of approximately 2-3 mm to provide an additional 2-3 mm of cross-sectional height of metal in those regions. The second end 42 of each metal gainer may be approximately 10-15 mm, and the first end 40 of each metal gainer may be approximately 15-20 mm. The side surfaces 44 of the metal gainers 34 may be oriented at approximately 2-5 degrees relative to a centerline of the gainer. The second ends 42 may be rounded. The resulting shape and size of the metal gainers provides necessary metal to flow and form into the finished flange length. Also, this enables the intermediate flange length and finished flange length to be equivalent in length.

Figure 4:
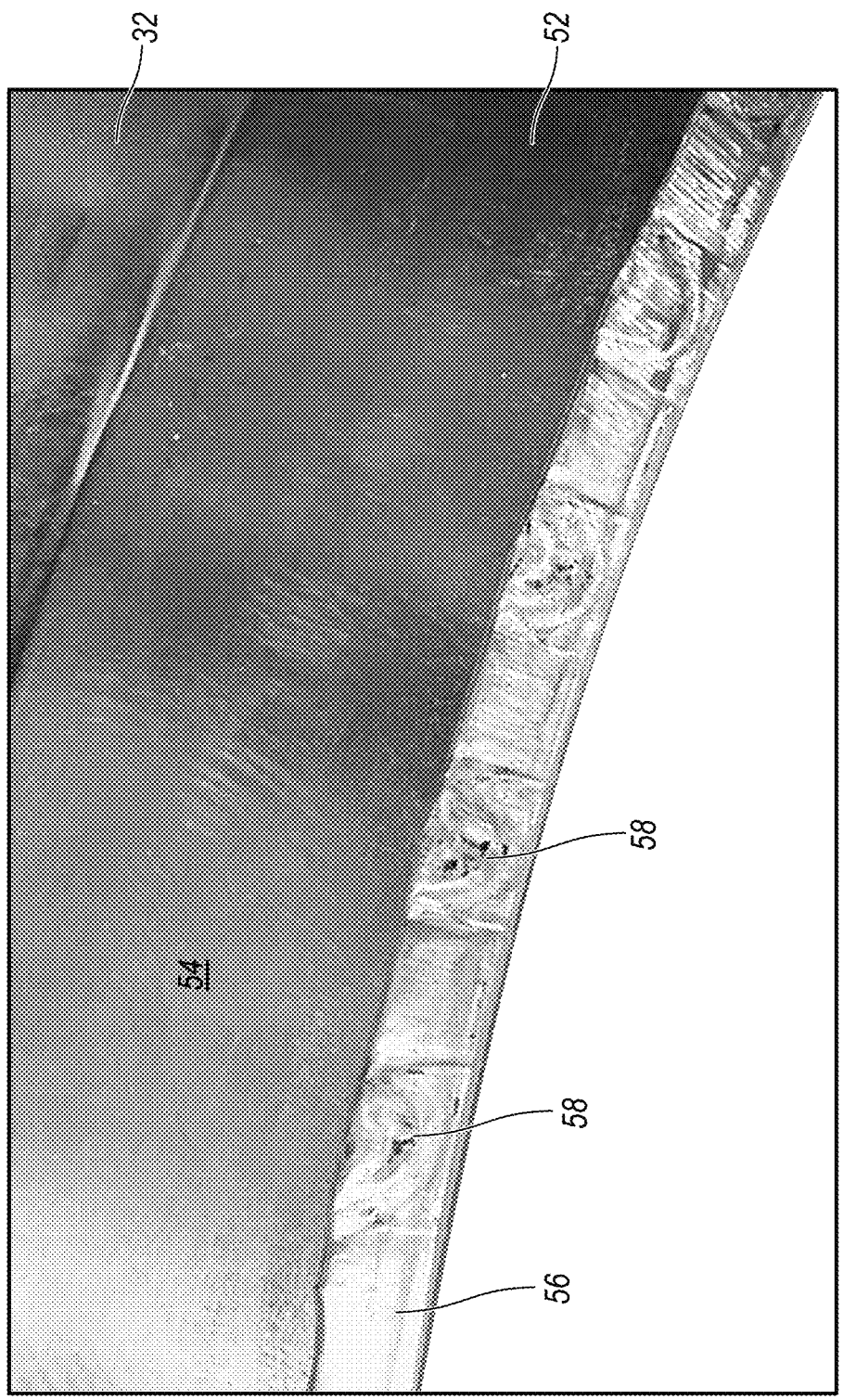
FIG. 4 is a perspective view of an end of the final flange formed after the step shown in FIG. 2C, in which the metal gainers have been removed from the exterior surfaces of the flange but evidence of their existence remains visible.

FIG. 4 shows the end of the final flange 52 of the final formed part extending from the body portion 32. As shown in the FIG. 4, the outer surface 54 shows no evidence of any metal gainers. However, the end surface 56 of the final flange 52 shows swirls and rounded markings 58 indicative of metal gainers being used prior to the final flanging step. These markings 58 show evidence of the presence of the metal gainers 34 being smoothened out during the final flanging step.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, shape, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of forming a metal part, comprising:
    drawing a sheet metal blank to form a drawn region and a flange region;
    performing a first flanging operation to the flange region with a first die to form an intermediate shaped part having a region of increased material on the flange region; and
    performing a second flanging operation to the intermediate shaped part with a second die to remove the region of increased material;
    wherein the step of performing the first flanging operation includes bending the flange region at a first angle.

2. The method of claim 1, wherein the first die includes an upper die with pockets configured to form the region of increased material during the first flanging operation.

3. The method of claim 2, wherein the first die includes a lower die with projections configured to be partially received within the pockets and form the region of increased material during the first flanging operation.

4. The method of claim 1, wherein the region of increased material includes an increased amount of metal compared to surrounding portions of the flange region to facilitate reduce stresses during the second flanging operation to improve a final shape of the metal part.

5. The method of claim 1, wherein the region of increased material has a first end at an edge of the flange region and an opposing second end.

6. The method of claim 5, wherein the region of increased material is wider at the first end than at the second end.

7. The method of claim 1, wherein the step of performing the second flanging operation includes additionally bending the flange region to take a second angle exceeding the first angle while removing the region of increased material.

8. A method of forming a metal piece from sheet metal, comprising:
    flanging a sheet metal blank with a die that includes surface features to form an intermediate flanged piece having a flange with regions of increased material; and
    flanging the intermediate flanged piece to smoothen or remove the regions of increased material into a final formed part;
    wherein the step of flanging the sheet metal blank includes bending the flange to extend away from a body of the drawn piece by a first angle, and flanging the intermediate flanged piece includes further bending of the flange by an additional angle.

9. The method of claim 8, further comprising, drawing, the sheet metal blank prior to the step of flanging the sheet metal blank.

10. The method of claim 8, wherein the die includes a lower die with projections configured to form the regions of increased material during the step of flanging the sheet metal blank.

11. The method of claim 8, wherein the regions of increased material include an increased amount of metal compared to surrounding portions of the flange to facilitate structural integrity during the step of flanging the intermediate flanged piece.

12. The method of claim 8, wherein the regions of increased material have a first end at an edge of the flange and an opposing second end.

13. The method of claim 12, wherein the regions of increased material are wider at the first end than the second end.

14. The method of claim 8, wherein the step of flanging the intermediate flanged piece includes bending the flange relative to a body of the intermediate flanged piece by an additional amount such that the flange of the final form part extends back toward a body of the final form part.

* * * * *